(12) United States Patent
Parsons (10) Patent No.: US 10,415,323 B2
(45) Date of Patent: Sep. 17, 2019

(54) EXPANDABLE TUBULAR THREAD PROTECTION

(71) Applicant: Ronald C. Parsons and Denise M. Parsons, trustees under the Ronald C. Parsons and Denise M. Parsons, Houston, TX (US)

(72) Inventor: Ronald C. Parsons, Houston, TX (US)

(73) Assignee: Ronald C. Parsons and Denise M. Parsons, Trustees under Ronald C. Parsons and Denise M. Parsons Living Trust, Houston, TX (US)

( * ) Notice: Subject to any disclaimer, the term of this patent is extended or adjusted under 35 U.S.C. 154(b) by 1028 days.

(21) Appl. No.: 14/836,480

(22) Filed: Aug. 26, 2015

(65) Prior Publication Data
US 2015/0368988 A1    Dec. 24, 2015

Related U.S. Application Data (62) Division of application No. 14/330,398, filed on Jul. 14, 2014, now abandoned.

(60) Provisional application No. 61/982,734, filed on Apr. 22, 2014.

(51) Int. Cl.
| | | |
|---|---|---|
| *E21B 17/042* | (2006.01) | |
| *E21B 17/10* | (2006.01) | |
| *E21B 43/10* | (2006.01) | |
| *F16L 15/08* | (2006.01) | |
| *F16L 57/00* | (2006.01) | |
| *F15B 21/00* | (2006.01) | |

(52) U.S. Cl.
CPC ........ *E21B 17/042* (2013.01); *E21B 17/1014* (2013.01); *E21B 17/1078* (2013.01); *E21B 43/106* (2013.01); *F16L 15/08* (2013.01); *F16L 57/00* (2013.01); *E21B 17/1085* (2013.01); *F15B 21/006* (2013.01); *F16L 2201/40* (2013.01)

(58) Field of Classification Search
CPC .......................... E21B 17/1014; E21B 17/1078
USPC .............................................. 285/294.3, 294.4
See application file for complete search history.

(56) References Cited

U.S. PATENT DOCUMENTS 330,624 A * 11/1885 Scaife
410,816 A * 9/1889 Walker et al.
494,147 A * 3/1893 Lloyd
(Continued)

FOREIGN PATENT DOCUMENTS

GB        2423559 A * 8/2006 ............ F16L 13/116

OTHER PUBLICATIONS

Notice of Allowance dated Mar. 20, 2015 for corresponding U.S. Appl. No. 14/322,345; 9 pgs.
(Continued)

*Primary Examiner* — James M Hewitt, II
(74) *Attorney, Agent, or Firm* — Jonathan M. Pierce; Porter Hedges LLP (57) ABSTRACT

For protecting a tubular or a component attached to the tubular, two sections of the expandable tubular are formed into two complete centralizing rings or two partial centralizing rings having a larger outer diameter than the remainder of the expandable tubular. A sleeve is placed over a box thread of the tubular or over the component. An adhesive fully covers the space between the inside diameter of the sleeve and the outside diameter of the box thread or component. The sleeve remains in place when the tubular is placed down hole.

13 Claims, 5 Drawing Sheets

(56) References Cited

U.S. PATENT DOCUMENTS

| | | | |
|---|---|---|---|
| 978,346 A * | 10/1910 | Yarrow | |
| 1,074,395 A * | 9/1913 | Welch | B29C 66/1122 285/294.4 |
| 3,989,281 A * | 11/1976 | Wilde, Jr. | F16L 13/0272 285/45 |
| 3,993,258 A | 11/1976 | Jacaobsson | |
| 4,275,757 A | 6/1981 | Singer | |
| 4,409,273 A | 10/1983 | Weitzel | |
| 4,414,696 A | 11/1983 | Weitzel | |
| 4,553,490 A | 11/1985 | Collet et al. | |
| 4,561,367 A | 12/1985 | Collet et al. | |
| 4,666,188 A * | 5/1987 | Hockett | F16L 31/00 285/294.3 |
| 4,668,396 A | 5/1987 | Baurmeister et al. | |
| 4,880,955 A | 11/1989 | Nitzinger et al. | |
| 5,127,116 A * | 7/1992 | Greig | B29C 63/346 285/21.2 |
| 5,270,207 A | 12/1993 | Matsumura et al. | |
| 5,306,148 A | 4/1994 | Nakamura | |
| 5,368,098 A | 11/1994 | Blizzard et al. | |
| 5,415,440 A * | 5/1995 | Kanao | F16L 13/11 264/171.27 |
| 5,453,006 A | 9/1995 | Nakamura | |
| 5,464,062 A | 11/1995 | Blizzard et al. | |
| 5,702,407 A | 12/1997 | Kaji | |
| 5,887,909 A * | 3/1999 | Tokuda | F16L 13/116 285/148.18 |
| 6,069,398 A | 5/2000 | Kadosh et al. | |
| 6,070,912 A * | 6/2000 | Latham | F16L 15/008 285/148.19 |
| 6,450,197 B1 | 9/2002 | Cardin | |
| 6,485,061 B1 | 11/2002 | Mosing et al. | |
| 6,722,443 B1 * | 4/2004 | Metcalfe | E21B 43/082 166/207 |
| 7,159,619 B2 | 1/2007 | Latiolais et al. | |
| 7,159,654 B2 | 1/2007 | Ellison et al. | |
| 7,182,450 B2 | 2/2007 | Aoshima | |
| 7,357,434 B2 | 4/2008 | Latiolais et al. | |
| 7,484,625 B2 | 2/2009 | Scott et al. | |
| 7,665,533 B2 | 2/2010 | Hopwood et al. | |
| 7,946,356 B2 | 5/2011 | Koederitz et al. | |
| 7,958,715 B2 | 6/2011 | Kinert et al. | |
| 8,016,037 B2 | 9/2011 | Bloom et al. | |
| 8,181,707 B2 * | 5/2012 | Evans | E21B 17/042 166/207 |
| 8,227,224 B2 | 7/2012 | Kalisz et al. | |
| 8,227,225 B2 | 7/2012 | Rocco et al. | |
| 8,227,233 B2 | 7/2012 | Kalisz et al. | |
| 8,283,153 B2 | 10/2012 | Rocco et al. | |
| 8,298,809 B2 | 10/2012 | Kalisz et al. | |
| 8,298,810 B2 | 10/2012 | Rocco et al. | |
| 8,313,939 B2 | 11/2012 | Kalisz et al. | |
| 8,348,320 B2 | 1/2013 | Latiolais et al. | |
| 8,356,674 B2 | 1/2013 | Murray et al. | |
| 8,597,948 B2 | 12/2013 | Raniere | |
| 8,622,261 B2 | 1/2014 | Itoh et al. | |
| 2005/0230109 A1 | 10/2005 | Kammann et al. | |
| 2007/0241558 A1 * | 10/2007 | Nestegard | B23K 31/12 285/294.2 |
| 2009/0208295 A1 | 8/2009 | Kinert et al. | |
| 2009/0318962 A1 | 12/2009 | Spedden et al. | |
| 2011/0266831 A1 | 11/2011 | Kalisz et al. | |
| 2011/0306107 A1 | 12/2011 | Kalisz et al. | |
| 2012/0124839 A1 | 5/2012 | Kalisz et al. | |
| 2013/0066370 A1 | 3/2013 | Spedden et al. | |
| 2013/0138136 A1 | 5/2013 | Beckham et al. | |
| 2013/0202855 A1 | 8/2013 | Kalisz et al. | |

OTHER PUBLICATIONS

Office Action dated Sep. 4, 2015 for corresponding U.S. Appl. No. 14/707,643 (22 pgs.).

Notice of Allowance dated Oct. 19, 2015 for corresponding U.S. Appl. No. 14/707,643.

* cited by examiner

EXPANDABLE TUBULAR THREAD PROTECTION

CROSS-REFERENCE TO RELATED APPLICATIONS

This application is a divisional application of U.S. patent application Ser. No. 14/330,398, filed Jul. 14, 2014, now abandoned, which claims the benefit under 35 U.S.C. § 119(e) of U.S. Provisional Patent Application No. 61/982,734, filed Apr. 22, 2014. The disclosure of said applications is hereby incorporated herein by reference in their entirety for all purposes.

STATEMENT REGARDING FEDERALLY SPONSORED RESEARCH OR DEVELOPMENT

Not Applicable.

BACKGROUND

Field of the Inventions

The present invention generally relates to protection of expandable tubular threads. More particularly, the present invention describes an expandable tubular with at least one centralizer as an integral part of the tubular, said centralizer protecting the expandable tubular threads. Furthermore, this invention relates to a downhole tubular or downhole assembly, e.g., for use in an oil/gas well or a water well.

Background of the Invention

In recent years, the use of expandable tubulars has become more common in the drilling and completion phases of well bore construction. In these phases, it is necessary to protect tubulars and related devices from scarring. For example, it is necessary to protect threaded connectors from scarring, when they are being placed in a well. It is also necessary to protect box threads during handling and storage.

Very often, the wall of the threaded box thread is very thin. This is caused by the minimum wall thickness to apply the thread. This thread outside diameter (OD) is easy to ding, scar or bend out of shape. If the box OD is scarred, the material will split while being expanded and cause a failure. The scars can be caused by the pipe rubbing the casing, casing connections, and other attachments while it is let down hole. The scarring also occurs with a directional change. An opening is often put in the casing to put the tubular through. These openings are rough and may have sharp and jagged edges, which will scar the tubular. In such cases, the tubular can split with excessive scarring, which results in a very expensive repair and lost time.

Figure 1:
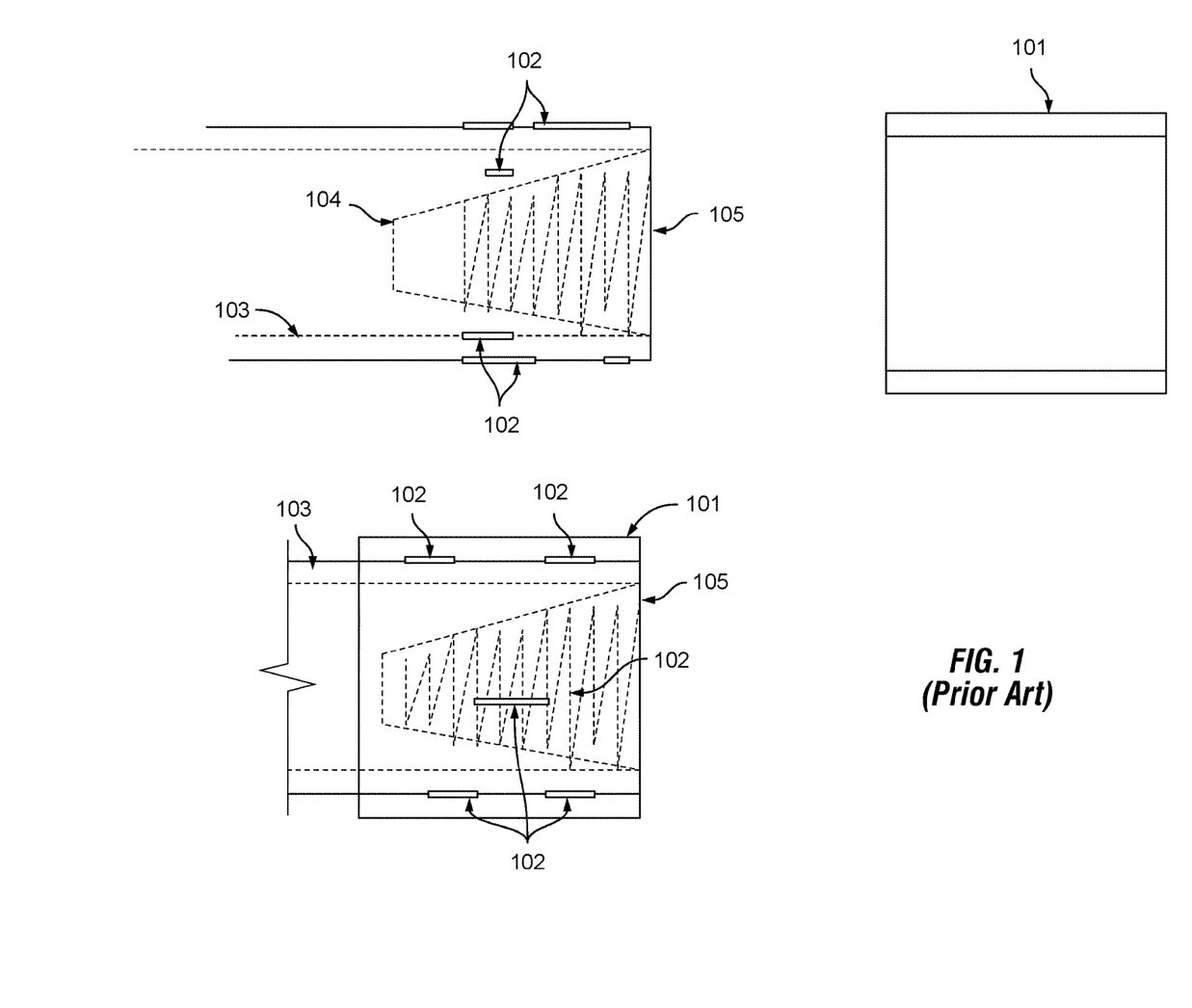

A current method to prevent such damages is to attach a steel protection sleeve by applying adhesive on the box OD with an epoxy glue applicator, as illustrated in FIG. 1, which represents the current method of attaching steel sleeves to protect connectors. Another method may be to use a brush or paddle stick. The sleeve is then slid over the box thread. When putting on the sleeve, the glue at times is pushed off by the sleeve. When the glue sets, there is no guarantee that the glue is in contact with the sleeve and box OD. There is also no guarantee that the glue is not thicker on one side or the other since there is no control to make sure that the glue covers the entire contact area evenly. In FIG. 1, 101 represents the protecting steel sleeve; 102 represents adhesive (or glue); 103 represents the tubular; 104 represents a connector; and 105 represents the box of the connector 104.

With the sleeve is installed in this manner, several undesirable situations can occur. (1) The sleeve touches the casing caused by the pressure of the tubing and seal. (2) The sleeve touches the casing while stacking the tubing or casing. (3) The sleeve hits the casing connectors. When any of the above three situations occurs, happens, the protective sleeve can break loose. If this happens, then the sleeve may run up the casing or tubing. Sometimes, several of these sleeves may become loose and come together, which will cause problem during tubular expansion. More seriously, there is no more protection for the threads. The threads can scar and split days later when expanded, causing extensive damage, incurring repair cost and lost time.

Accordingly, there is continuing need and interest to develop methods and systems to protect expandable tubular threads.

SUMMARY

Herein disclosed is a method of protecting a tubular or a component attached to the tubular, comprising making two sections of the expandable tubular into two complete centralizing rings or two partial centralizing rings having a larger outer diameter than the remainder of the expandable tubular, wherein the two complete centralizing rings or partial centralizing rings are on two ends of the component.

In some embodiments, the component includes a box thread. In some embodiments, the outer diameter of the two complete or partial centralizing rings is larger than or equal to the outer diameter of the component attached to the tubular. In some embodiments, the tubular comprises a casing, a liner, a screen, or a production tubing.

In some embodiments, the method furthering comprises placing a sleeve between the two complete or partial centralizing rings and over the component. In some embodiments, the sleeve is a steel sleeve. In some embodiments, the sleeve is held in place by the two complete or partial centralizing rings to protect the component.

Also disclosed herein is an assembly comprising an expandable tubular and a component attached to the tubular; two sections of the expandable tubular having a larger outer diameter than the remainder of the expandable tubular, forming two complete centralizing rings or two partial centralizing rings, wherein the two complete centralizing rings or partial centralizing rings are on two ends of the component.

In some embodiments, the outer diameter of the two complete or partial centralizing rings is larger than or equal to the outer diameter of the component attached to the tubular. In some embodiments, the component includes a box thread.

In some embodiments, the assembly further comprises a sleeve placed between the two complete or partial centralizing rings and over the component. In some embodiments, the sleeve is held in place by the two complete or partial centralizing rings to protect the component.

Further discussed is a method of protecting a component attached to an expandable tubular, comprising placing a sleeve over the component, wherein the sleeve comprises an input port and at least two tell holes; applying an adhesive through the input port to fill the space between the inside diameter of the sleeve and the outside diameter of the component until the adhesive comes out of the at least two tell holes. The adhesive fully covers the space between the inside diameter of the sleeve and the outside diameter of the component such that the sleeve remains in place when the tubular is placed down hole.

In some embodiments, the method further comprises making two sections of the expandable tubular into two complete centralizing rings or two partial centralizing rings having a larger outer diameter than the remainder of the expandable tubular, wherein the two complete centralizing rings or partial centralizing rings are on two ends of the component and sleeve.

In some embodiments, applying the adhesive comprises using a pump, a mixing tube, and a sealed input cap. In some embodiments, the pump includes a plural component pump.

Also discussed herein is an assembly comprising an expandable tubular, a component attached to the tubular, a sleeve over the component and an adhesive; wherein the adhesive fully covers the space between the inside diameter of the sleeve and the outside diameter of the component. The sleeve remains in place when the tubular is placed down hole.

In some embodiments, the assembly further comprises two sections of the expandable tubular having a larger outer diameter than the remainder of the expandable tubular, forming two complete centralizing rings or two partial centralizing rings, wherein the two complete centralizing rings or partial centralizing rings are on two ends of the component and sleeve.

The present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 1 illustrates an existing method for protecting expandable tubular threads. The glue is applied on areas of the box OD and the sleeve is slid on.

DETAILED DESCRIPTION

Overview. To protect expandable tubular threads and to centralize an expandable tubular, at least a section of the tubular is enlarged to have a larger OD than the remainder of the expandable tubular, forming at least one complete centralizing ring or at least one partial centralizing ring (i.e., a complete ring of 360 degrees or a segment/segments thereof as a partial ring). When the tubular is being placed downhole, the centralizing rings (complete and/or partial) serve to centralize the tubular whiling minimizing scarring and protecting the threads and devices attached to the tubular (e.g., seals and anchors). After the tubular is placed downhole and radially expanded, the centralizing ring will expand along with the remainder of the tubular and the expanded tubular will have the same diameter. In other words, these centralizing rings (complete and/or partial) function to centralize the expandable tubular and protect expandable tubular threads; and then they disappear after the tubular is expanded.

As used herein, the term "tubular" refers to any tubular parts or components, especially related to the oil/gas/water well applications and downhole processes. Examples of such tubulars include a casing, a liner, a screen, or a production tubing.

Figure 2:
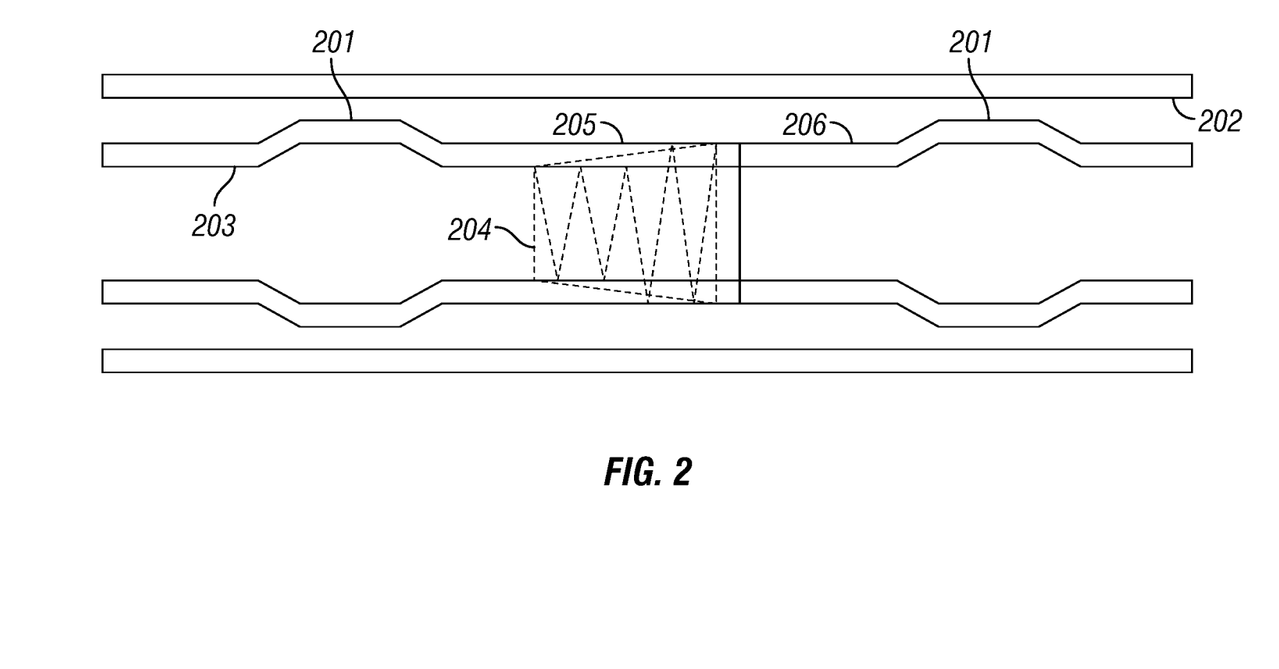
FIG. 2 illustrates a method of protecting expandable tubular threads with two expandable centralizing rings (centralizers), according an embodiment of this disclosure.

As illustrated in FIG. 2, a method of protecting expandable tubular threads with two expandable centralizing rings (centralizers) is shown. In an embodiment, two centralizers are placed on the two ends of the thread so that when the tubular is let down hole, one centralizer is above the thread and the other is below. These centralizers keep the thread OD from being scarred while the tubular is being placed into a well/hole. The casing connectors and casing wall cannot touch the thread OD. In FIG. 2, 201 represents the centralizing ring(s), 202 represents a casing; 203 represents a tubing (or expandable tubular); 204 represents a thread; 205 represents a box end; and 206 represents a pin end.

Figure 3:
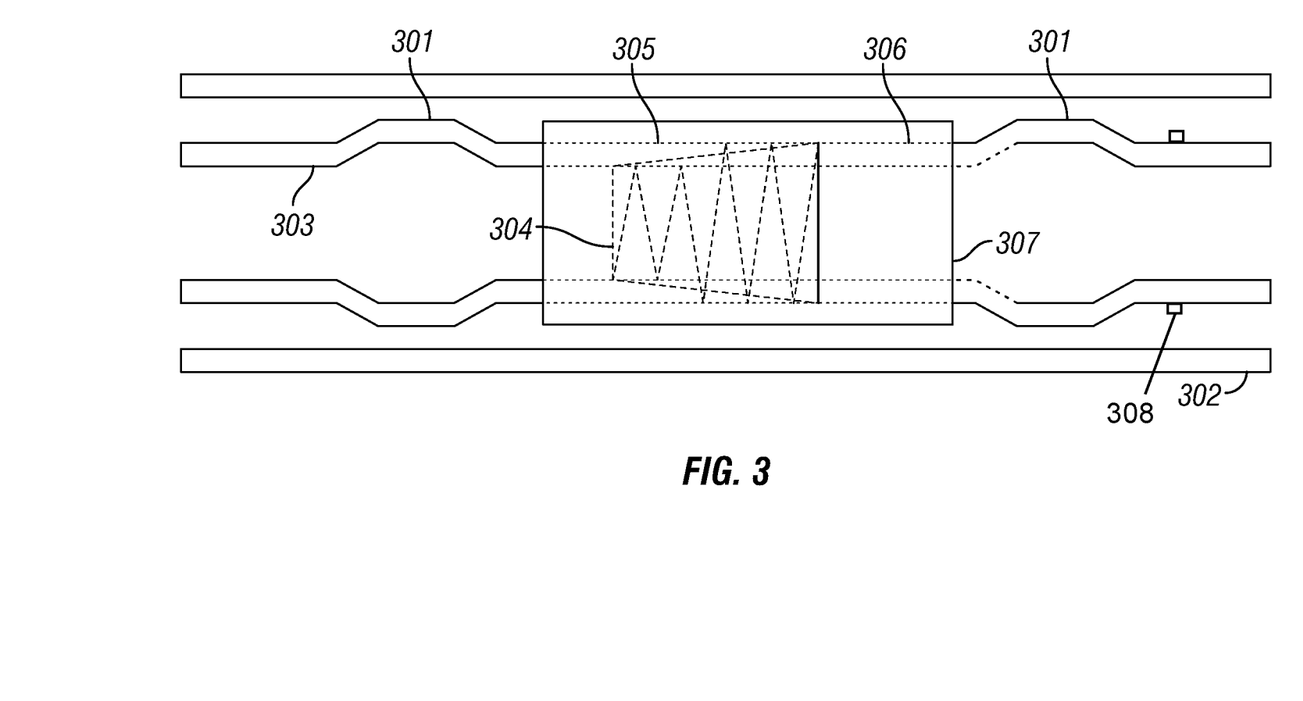
FIG. 3 illustrates a method of protecting expandable tubular threads with two expandable centralizing rings (centralizers) and an extended steel sleeve, according an embodiment of this disclosure. The rings hold the sleeve in place, the sleeve cannot break loose. Adhesive is not required in this embodiment.

Another method is illustrated in FIG. 3, wherein the thread is protected by using two centralizers and an extended steel sleeve. In an embodiment, the centralizers are placed in the same way as the previous method shown in FIG. 2 and the extended steel sleeve is placed between the two centralizers and cover the thread. The centralizers hold the sleeve in place so that the sleeve cannot break loose. An adhesive to attaching the steel sleeve is not required. In some cases, the extended steel sleeve is longer than the typical steel sleeve used in the art. The steel sleeve is long enough to cover the thread area and the space between the centralizing rings. This steel sleeve is placed on the box OD before screwing the male and female together. The expanded centralizing rings stop the protection sleeve from moving away from the threaded box OD when the tubular is placed down hole. In FIG. 3, 301 represents the centralizing ring(s); 302 represents a casing; 303 represents a tubing (or expandable tubular); 304 represents a thread; 305 represents a box end; 306 represents a pin end; 307 represents a scar protecting sleeve; and 308 represents seals or anchors.

Figure 4:
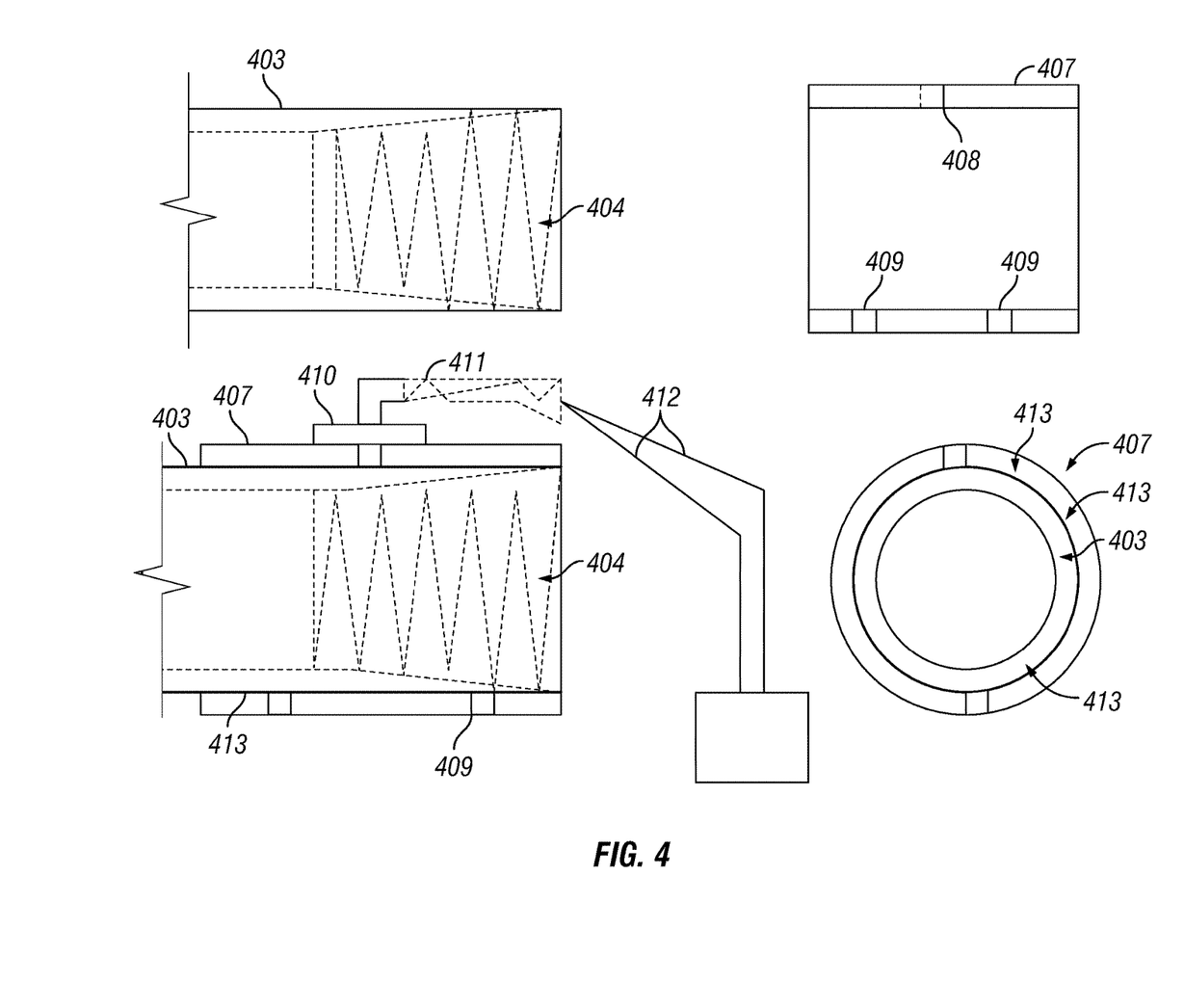
FIG. 4 illustrates a method of protecting expandable tubular threads by filling the area between the inside diameter (ID) of the steel sleeve and the outside diameter (OD) of the threaded box completely with adhesive, according an embodiment of this disclosure. Such full coverage of adhesive stops the sleeve from coming loose and causing damage to the tubing and well.

In another embodiment, as shown in FIG. 4, a method of protecting the thread using a steel sleeve is shown. The method comprises placing a sleeve over the component, wherein said sleeve comprises an input port and at least two tell holes; applying an adhesive through the input port to fill the space between the inside diameter of the sleeve and the outside diameter of the component until the adhesive comes out of the at least two tell holes. In FIG. 4, 403 represents a tubular; 404 represents a thread; 407 represents a sleeve (or steel protection sleeve); 408 represents an input port; 409 represents tell holes; 410 represents a sealed cap; 411 represents adhesive mixing tube; 412 presents a plurality of adhesive hoses; and 413 represents adhesive fully covering the space between the thread and the sleeve.

The adhesive to attach the steel sleeve is applied such that the steel sleeve cannot move away or become detached. In an embodiment, the adhesive is applied using a plural component pump, a mixing tube, and a sealed input cap. With the sleeve in place (placed over the box OD), the sealed cap is attached to the steel sleeve. The input cap is attached to a chemical (adhesive) mixing tube. The plural components are blended together as they are pumped from the unmixed adhesive containers. The pumping continues until the adhesive comes out the small "tell holes" in the bottom of the sleeve. The tell holes cam be in any position and when adhesive comes out both holes, the space between the sleeve and the box OD is completely filled. This method of applying the adhesive ensures that the area between the inside diameter of the steel sleeve and the outside diameter of the threaded box is completely filled and covered with adhesive. This full coverage prevents the sleeve from coming loose and causing damage to the tubing and/or well. This method may be used to apply the adhesive to short sleeves or long (extended) sleeves between the centralizing rings (centralizers).

The adhesive applied in this method is another layer of protection to ensure that the box OD is not scarred. Because sometimes when the tubular passes through an opening in the casing, it could touch the edge of the hole. When this happens, the tubing will ride up the approach angle of the rings/centralizers and down the other side so that the casing wall may contact the protecting steel sleeve that is held in place by the centralizers. With the adhesive holding the steel sleeve in place, the box OD will not be scarred because the steel sleeve cannot be dislodged.

As is clear to one skilled in the art, the method of applying the adhesive without the centralizers is also a significant improvement over the existing method. Furthermore, the methods discussed hereinabove are not limited to protecting threads only but any device or attachment related to a tubular that is to be placed down hole.

Advantages. The methods discussed hereinabove reduce the possibility of damaged threads. A damaged thread will cost many hours of down time. If there are no replacements available, the items will have to come from the factory and the down time would be even longer.

Using the extended/longer steel sleeve stops typical normal damages to the threaded connection. Using the extended/longer sleeve and two centralizers increases production and reduces delivery time. The sleeve is applied at the well. If the parts are short enough for shipment, the product can be made ready before delivery.

Using the disclosed method of applying the adhesive to the sleeves helps to ensure they remain in place. Using these methods will also reduce the cost of expandable tubular products.

Figure 5:
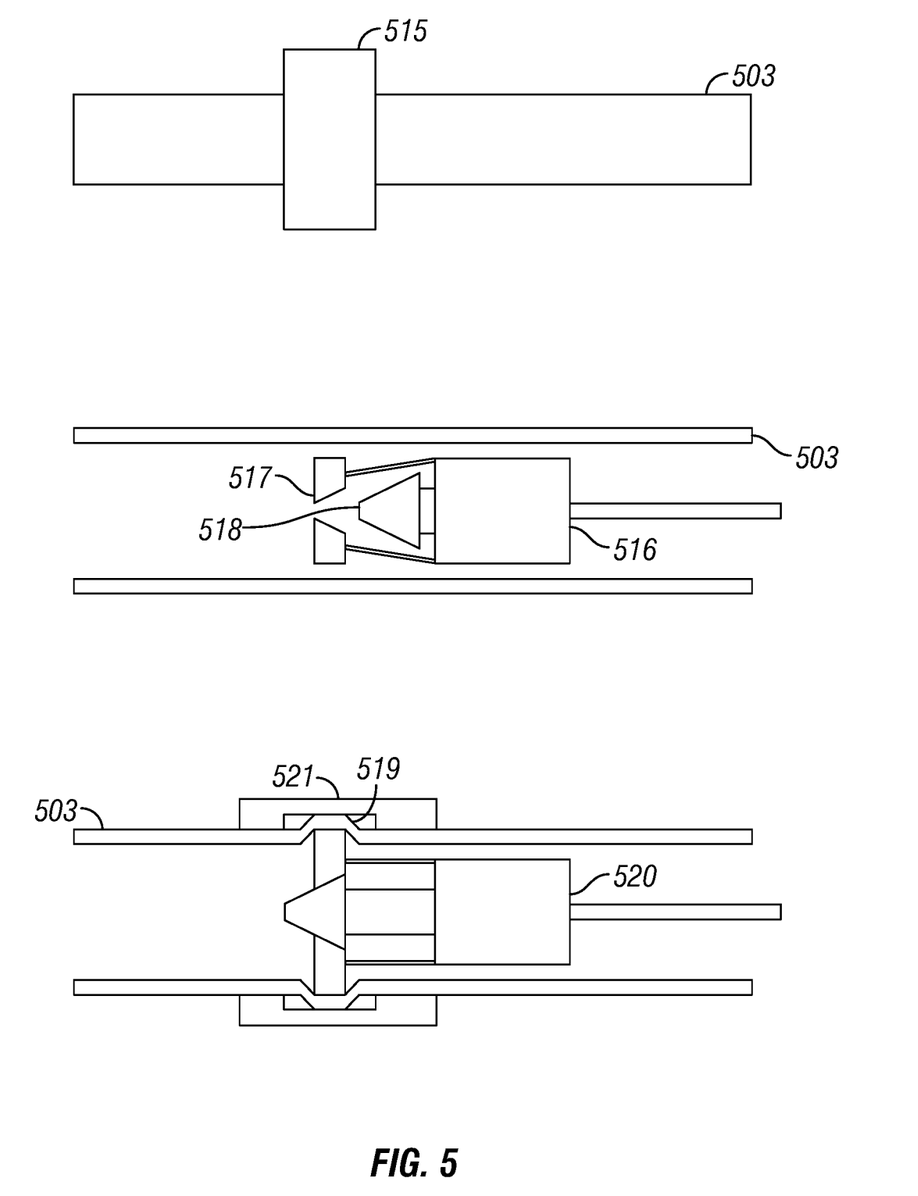
FIG. 5 illustrates how a centralizing ring of this disclosure is made for an expandable tubular, according an embodiment of this disclosure.

Method of making expandable tubulars with centralizing rings. In an embodiment, a centralizing ring of this disclosure is made using hydraulic or mechanical fixtures. For example, as shown in FIG. 5, an expanding anvil is placed in an expandable tubular (tubing or casing), at a first desired position. A sizing block (or sizing cap or sizing clamp) is attached to the outside of the tubular to ensure the proper diameter of a centralizing ring is created. The anvil is then mechanically expanded until the sizing clamp stops the expansion. The anvil (or ram) is moved to another location and the process is repeated to create a second centralizing ring as needed/desired. In some cases, the expandable tubular is heated before the centralizing rings are created. In some cases, induction heating is used to heat the tubular before the centralizing rings are made. Other suitable methods may also be used to form the centralizing rings/centralizers. In FIG. 5, 503 represents a tubing or casing; 515 represents induction heating ring (as needed); 516 represents a hydraulic ram; 517 represents an expanding ring; 518 represents an expanding ram; 519 represents an expanded ring; 520 represents an extended ram; and 521 represents a sizing cap.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method of protecting an expandable tubular, comprising:
    expanding a section of a first expandable tubular having a box thread to form a complete centralizing ring or a partial centralizing ring having a larger outer diameter than a remainder of the first expandable tubular;
    expanding a section of a second expandable tubular to form a complete centralizing ring or a partial centralizing ring having a larger outer diameter than a remainder of the second expandable tubular;
    placing a sleeve over the box thread, wherein said sleeve comprises an input port and at least two tell holes;
    screwing the first expandable tubular to the second expandable tubular;
    maintaining the sleeve in place by the complete or partial centralizing ring of the first expandable tubular and the second expandable tubular; and
    applying an adhesive through the input port to fill a space between an inside diameter of the sleeve and an outside diameter of the box thread until the adhesive comes out of the at least two tell holes.

2. The method of claim 1 wherein the adhesive fully covers the space between the inside diameter of the sleeve and the outside diameter of the box thread.

3. The method of claim 1 wherein applying the adhesive comprises using a pump, a mixing tube, and a sealed input cap.

4. The method of claim 3 wherein said pump includes a plural component pump.

5. An assembly comprising:
    two expandable tubulars connected by a thread including a box thread, each expandable tubular including a complete centralizing ring or a partial centralizing ring having a larger outer diameter than a remainder of the expandable tubular;
    a sleeve placed over the box thread and maintained in place by the complete or partial centralizing ring of each of the two expandable tubulars, wherein said sleeve comprises an input port and at least two tell holes; and
    an adhesive, wherein said adhesive fully covers a space between an inside diameter of the sleeve and an outside diameter of the box thread.

6. A method of protecting a tubular having a threaded connector including a box thread, comprising:
    making two sections of an expandable tubular into two complete centralizing rings or two partial centralizing rings having a larger outer diameter than a remainder of the expandable tubular, wherein said two complete centralizing rings or partial centralizing rings are on two ends of the box thread;

placing a sleeve between the two complete or partial centralizing rings and over the box thread;

holding the sleeve in place between the two complete or partial centralizing rings; and filling a space between an inside diameter (ID) of the sleeve and an outside diameter (OD) of the box thread completely with adhesive.

7. The method of claim 6, wherein the outer diameter of the two complete or partial centralizing rings is larger than or equal to an outer diameter of seals or anchors attached to the tubular.

8. The method of claim 6, wherein said expandable tubular comprises a casing, a liner, a screen, or a production tubing.

9. The method of claim 6 wherein the sleeve is a steel sleeve.

10. An assembly comprising:

an expandable tubular having a threaded connector including a box thread;

two sections of the expandable tubular having a larger outer diameter than a remainder of the expandable tubular, forming two complete centralizing rings or two partial centralizing rings, wherein said two complete centralizing rings or partial centralizing rings are on two ends of the box thread;

a sleeve between the two complete or partial centralizing rings and over the box thread, wherein the sleeve is held in place between the two complete or partial centralizing rings; and an adhesive filling a space between an inside diameter (ID) of the sleeve and an outside diameter (OD) of the box thread completely.

11. The assembly of claim 10 further comprising seals or anchors attached to the expandable tubular, wherein the outer diameter of the two complete or partial centralizing rings is larger than or equal to an outer diameter of the seals or anchors.

12. The assembly of claim 10, wherein said expandable tubular comprises a casing, a liner, a screen, or a production tubing.

13. The assembly of claim 10 wherein the sleeve is a steel sleeve.

* * * * *